(12) United States Patent
Hoover

(10) Patent No.: US 6,525,751 B2
(45) Date of Patent: Feb. 25, 2003

(54) RASTER OUTPUT SCANNER FRACTION-OF-SCAN POLYGON REPHASING AND ALGORITHM

(75) Inventor: Martin E. Hoover, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 43 days.

(21) Appl. No.: 09/865,380

(22) Filed: May 25, 2001

(65) Prior Publication Data

US 2002/0175988 A1 Nov. 28, 2002

(51) Int. Cl.$^7$ .............................. B41J 2/385; B41J 2/47
(52) U.S. Cl. ...................... 347/116; 347/234; 347/248
(58) Field of Search ............................... 347/116, 234, 347/235, 248, 249, 250

(56) References Cited

U.S. PATENT DOCUMENTS

| | | | |
|---|---|---|---|
| 4,611,901 A | 9/1986 | Kohyama et al. | 399/231 |
| 4,613,877 A | 9/1986 | Spencer et al. | 347/133 |
| 4,791,452 A | 12/1988 | Kasai et al. | 399/40 |
| 4,833,503 A | 5/1989 | Snelling | 399/231 |
| 4,837,636 A | 6/1989 | Daneile et al. | 358/300 |
| 4,893,135 A | 1/1990 | Jamzadeh | 347/248 |
| 5,081,477 A | 1/1992 | Gibson | 7/133 |
| 5,115,256 A | 5/1992 | Miyagi et al. | 7/249 |
| 5,208,796 A | 5/1993 | Wong et al. | 369/97 |
| 5,237,521 A | 8/1993 | Raj et al. | 702/163 |
| 5,264,870 A | 11/1993 | Egawa | 7/248 |
| 5,302,973 A | 4/1994 | Costanza et al. | 438/158 |
| 5,305,023 A * | 4/1994 | Fukushige et al. | 347/116 |
| 5,381,165 A | 1/1995 | Lofthus et al. | 347/232 |
| 5,654,951 A | 8/1997 | Hoover et al. | 369/97 |
| 5,710,751 A | 1/1998 | Hoover | 369/97 |
| 5,808,658 A | 9/1998 | Hoover | 347/250 |
| 6,094,208 A | 7/2000 | Oda et al. | 347/118 |

* cited by examiner

Primary Examiner—Hai Pham
(74) Attorney, Agent, or Firm—Oliff & Berridge, PLC

(57) ABSTRACT

A method and apparatus is presented for registering a plurality of color images formed on a photoconductive surface in a process direction. According to one embodiment of the invention, the registration simplified by the use of a method that does not require the use of a controller having a divide function. According to another embodiment of the invention, an apparatus is presented to compensate for variations in distances between a rotating polygon and a sensor detecting a position of a photoconductive member.

17 Claims, 7 Drawing Sheets

RASTER OUTPUT SCANNER FRACTION-OF-SCAN POLYGON REPHASING AND ALGORITHM

REFERENCE TO RELATED APPLICATIONS

The subject matter of this application relates to U.S. Pat. No. 5,808,658. The aforementioned patent and the references cited therein, are incorporated herein by reference.

FIELD OF THE INVENTION

This invention relates generally to a raster output scanning system for producing a high intensity imaging beam which scans across a movable photoconductive member to record electrostatic latent images thereon, and, more particularly, to an apparatus for providing registration of the beam in the process direction of the photoconductive member.

BACKGROUND OF THE INVENTION

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan linearly across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with art input image serial data stream at a rate such that individual picture elements ("pixels") of the image represented by the data stream are exposed on the photosensitive medium to form a latent image, which is then developed and transferred to an appropriate image receiving medium such as paper. Color laser printers may operate in either a single pass or multiple pass system.

In a single pass, process color xerographic system, three ROS stations are positioned adjacent to a photoreceptor surface and selectively energized to create successive image exposures, one for each of the three basic colors. A fourth ROS station may be added if black images are to be created as well. In a multiple pass system, each image area on the photoreceptor surface must make at least three revolutions (passes) relative to the transverse scanline formed by the modulated laser beam generated by a ROS system. With either system, each color separation image must be registered to within a 0.1 mm circle or within a tolerance of ±0.05 mm. Each color image must be registered in both the photoreceptor process direction (slow scan registration) and in the direction perpendicular to the process direction (referred to as fast scan or transverse registration). Registration in the transverse direction of a single pass ROS system is known in the prior art and a preferred registration technique is disclosed in U.S. Pat. No. 5,237,521 issued on Aug. 17, 1993, assigned to the same assignee as the present invention and hereby incorporated by reference.

In a color printer, the alignment of the lead edge of the color image is made difficult if a Raster Output Scanner (ROS) is used to expose the photoreceptor (PR). Typically as the PR travels into the position where the first scanline is to be imaged, it is sensed by a hole sensor detecting a hole in the belt. It is desired to image the first scanline immediately when this occurs and to repeat this for all four colors to achieve perfect lead edge color registration. However, because of the scanning nature of the ROS imager, the ROS spot, more than likely will not be at the SOS (start of scan) position as the PR hole arrives at the hole sensor. If this is the case, the system must wait until the next scanline crosses the SOS sensor to begin imaging. During this delay, the PR will have traveled and the first scan will be misregistered by a maximum of one full pixel or for a 600 spi single-beam ROS, over 40 microns. A typical prior art registration technique is disclosed in U.S. Pat. No. 5,381,165 showing registration by a feedback loop in which the phase and frequency of SOS signals and a reference signal are compared to produce an error signal representing frequency differences between rotating polygons associated with each Raster Output Scanner in a system of multiple raster output scanners. U.S. Pat. No. 5,808,658 discloses a technique for adjustment of a ROS imager relative to a hole sensor to adjust for registration of an image in wholepixel increments. This technique involves a simplified mathematical procedure not requiring the use of a divide capability in a micro-controller.

SUMMARY OF THE INVENTION

In one embodiment, the present invention is directed toward a method and apparatus for sub-scan image registration adjustment of a ROS imager relative to a hole sensor. In this embodiment, the invention is particularly well suited toward single pass multi-ROS imaging systems, allowing precise image-on-image registration by compensating for differences in distance between each ROS imager and its corresponding hole sensor. In another embodiment, the present invention is directed toward a method and apparatus for minimizing an appropriate adjustment during positional rephasing in the rotational position of a polygon within a ROS imager.

According to various embodiments of the invention, a method and a controller for performing the method are provided for calculating image registration in a process direction by minimizing a required phase shift of a rotating polygon in a raster output scanner. The method having the step of determining a requested phase shift in clock cycles of said rotating polygon to align a beam reflected from a first facet of said rotating polygon to a location on a photoconductive surface. If the requested phase shift in clock cycles is greater than a number of clock cycles equal to one-half of a period between the first facet and a neighboring, subsequent second facet, subtract a number of clock cycles equal to a period between the first facet and the second facet from the requested phase shift in clock cycles to determine a required phase shift and decrement a line counter by one. However, if the requested phase shift in clock cycles is less than a negative number of clock cycles equal to one-half of a period between the first facet and the second facet, add a number of clock cycles equal to a period between the first facet and the second facet from the requested phase shift in clock cycles to determine the required phase shift and increment the line counter by one. Although, if the requested phase shift in clock cycles is greater than or equal to a negative number of clock cycles equal to one-half of a period between the first facet and the second facet and is less than or equal to a number of clock cycles equal to one-half of a period between the first facet and the second facet the required phase shift is equated to the requested phase shift. In these embodiments of the invention, the line counter represents a number of scans before a start of image registration on the photoconductive surface.

According to another embodiment of the invention, a raster output scanner imaging apparatus is provided, having a photoconductive surface adapted to move in a process direction relative to a frame, a first rotating polygon rotatably mounted to the frame and having a plurality of facets adapted to reflect a beam onto the photoconductive surface in the form of first scanlines oriented transverse to the process direction, a first sensor corresponding to the first rotating polygon and mounted to the frame and near the photoconductive surface to enable positional information of the photoconductive surface to be detected. Also provided are a second rotating polygon rotatably mounted to the frame and having a plurality of facets adapted to reflect a beam onto the photoconductive surface in the form of second scanlines oriented transverse to the process direction, a second sensor corresponding to the second rotating polygon and mounted to the frame and near the photoconductive surface to enable positional information of the photoconductive surface to be detected and a controller in communication with the first rotating polygon, the first sensor, the second rotating polygon and the second sensor for synchronizing the first rotating polygon and the second polygon to position the first scanlines and the second scanlines at a common location on the photoconductive surface by the use of clock cycle counts. The controller is adapted to adjust a rotational position of at least one of the first rotating polygon and the second rotating polygon based at least on a difference in a first distance between the first rotating polygon and the first sensor and a second distance between the second rotating polygon and the second sensor.

A raster output scanner imaging apparatus is provided in another embodiment of the invention, having a photoconductive surface adapted to move in a process direction relative to a frame, a rotating polygon rotatably mounted to the frame and having a plurality of facets adapted to reflect a beam onto the photoconductive surface in the form of scanlines oriented transverse to the process direction and a sensor corresponding to the rotating polygon and mounted to the frame and near the photoconductive surface to enable positional information of the photoconductive surface to be detected. Also, controller is provided and is in communication with the rotating polygon and the sensor for adjusting a rotational position of the rotating polygon to position the scanlines at a desired location on the photoconductive surface by the use of clock cycle counts based at least on a distance between the rotating polygon and the sensor.

According to another embodiment of the invention, an imaging system for forming multiple superimposed image exposure frames on a photoconductive surface moving in a process direction having a raster output scanner forming a plurality of scanlines in a transverse direction across the width of the member by reflecting modulated beams from a plurality of facets of a rotating polygon, a photoconductive surface indicator for registering images on the photoconductive surface, means for detecting the beginning of a scanline and providing a start of scan (SOS) signal representing the detection, means to detect the relative phase between the lead edge of the start of scan signals and the detection of the indicator including a fast clock timer to provide a phase shift digital count means to detect the rephase adjust required to correct for a distance between the raster output scanner and a sensor corresponding to the raster output scanner, and means to change the speed of the rotating polygon to synchronize the phase of the indicator with the lead edge of the SOS signals and incorporate the rephase adjust.

According to another embodiment, in an imaging system for forming multiple superimposed image exposure frames on a photoconductive surface moving in a process direction, a method of providing scanning speed and phase shift control including the following steps. Forming a plurality of scanlines in a transverse direction across the width of the member by reflecting modulated beams from a plurality of facets of a rotating polygon, sensing scanning speed, providing a signal representing image exposure frame registration, detecting the beginning of a scanline and providing a start of scan (SOS) signal representing the detection, detecting the rephase adjust required to correct for a distance between the rotating polygon and a sensor corresponding to the rotating polygon, determining the relative phase between the start of scan signal and the signal representing image exposure frame registration, converting scanning speed and relative phase into digital signals, and summing the digital signals and subtracting the rephase adjust and inverting the polarity in order to change the speed of the rotating polygon to synchronize the signal representing image exposure frame registration with the SOS signal.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION OF THE INVENTION

Figure 1:
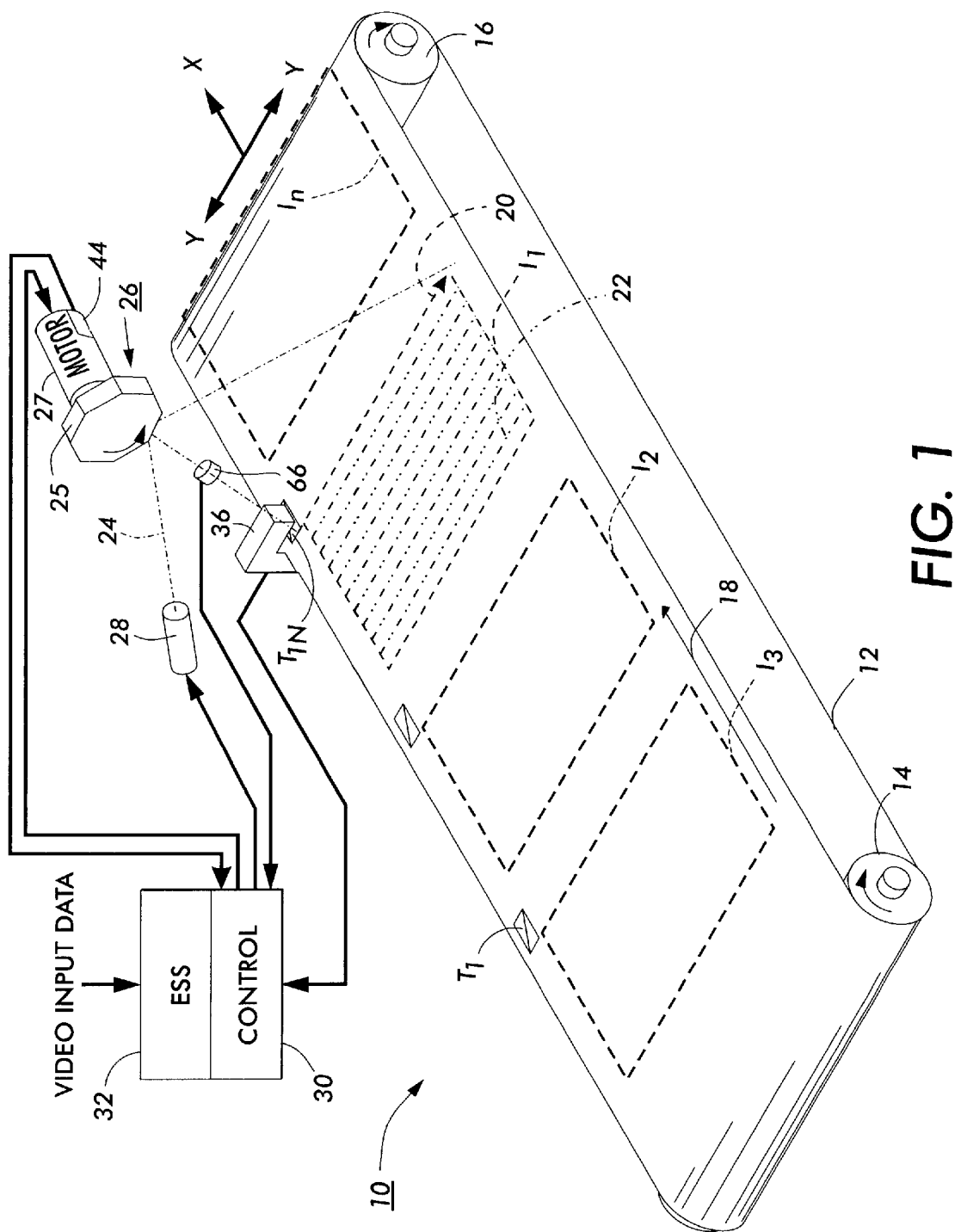
FIG. 1 illustrates a single-ROS printing system according to an embodiment of the present invention.

In FIG. 1, a multi-pass xerographic printing system is depicted schematically and designated generally by reference numeral 10. The system 10 includes a photoreceptive belt 12 entrained about guide rollers 14 and 16, at least one of which is driven to advance the belt 12 in a longitudinal direction of processing travel depicted by the arrow 18. The length of the belt 12 is designed to accept an integral number of spaced image areas $I_1$–$I_n$ represented by dashed line rectangles in FIG. 1. As each of the image areas $I_1$–$I_n$ reaches a transverse line of scan, represented by a dashed arrow 20, it is progressively exposed on closely spaced transverse raster lines 22 shown with exaggerated longitudinal spacing on the image area $I_1$ in FIG. 1.

In the printing system depicted in FIG. 1, the line 20 is scanned by a raster output scanner so that a modulated laser beam 24 is reflected to the line 20 by successive facets 25 on a rotatable polygon-shaped mirror 26. The beam 24 is emitted by a laser device 28 such as a laser diode, operated by a laser drive module forming part of a control processor generally designated by the reference numeral 30. The processor 30 includes other not shown circuit or logic modules such as a scanner drive command circuit, by which operation of motor 27 for rotating the polygon mirror 26 is controlled. A start of scan (SOS) sensor, shown at 66, determines a start of scan reference point and also provides suitable feedback signals to control 30.

In the operation of the system 10, as thus far described, the control 30 responds to a video signal to expose each raster line 22 to a linear segment of the video signal image. In a multi-pass system such as the system 10, where only one raster output scanner or head is used, complete exposure of each color image area requires four revolutions of the belt 12. In xerographic color systems, each image area $I_1$–$I_n$, must be exposed in the same manner to four successive exposures, one for each of the three basic colors and black.

Figure 2:
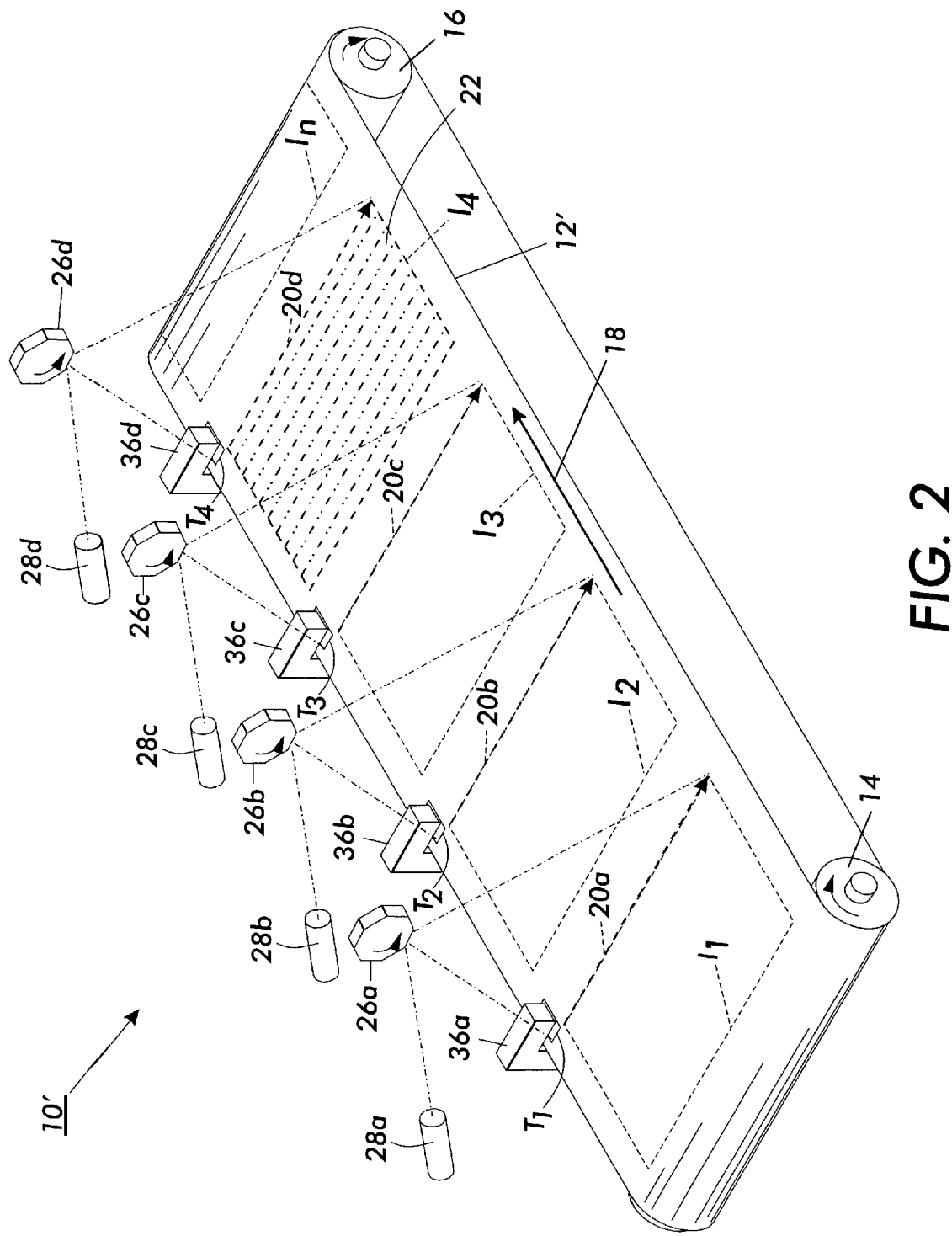
FIG. 2 illustrates a multi-ROS, single-pass printing system according to an embodiment of the present invention.

The single-pass, ROS color printing system 10' of FIG. 2 has four ROS stations, 26a, 26b, 26c, and 26d. The fourth station is preferably used to achieve full process color including black. The image areas $I_1$–$I_n$ are successively exposed on successive raster lines 22 as each raster line registers with a transverse scanline 20 as a result of longitudinal movement of the belt 12.

The length of the transverse scanline 20 in system 10 is preferably longer than the transverse dimension of the image areas I. Scanline length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scanline may be shifted in a transverse direction by control of the laser drive module and the transverse position of the exposed raster lines 22, and image areas $I_1$–$I_n$, shifted in relation to the belt 12.

As illustrated, any suitable marker on the photoconductive surface or belt or any suitable hole, such as targets $T_1 \ldots T_N$, provides a reference for each projected image on the belt surface. In other words, the detection by sensor of a mark or hole in the photoconductive surface establishes a reference for a start position of the image on the photoconductive surface, such as the first scanline of the projected image, and in a multi-pass image-on-image system, helps to establish image-on-image registration. In addition, the start of scan signals indicate the scanning laser beam to be at a start of scan position with reference to the photoconductive surface.

In the single-ROS, multi-pass system of FIG. 1, targets $T_1$–$T_N$ are located along a marginal edge of the belt 12 to be aligned in a longitudinal direction and are spaced to be located slightly ahead of each image areas $I_1$–$I_n$ or upstream from each such area in the context of belt travel. In a single-ROS configuration, a single sensor 36, such as a hole sensor, is located to be aligned with targets $T_1$–$T_N$ for the image area passing the transverse scanline 20 in FIG. 1.

With reference to FIG. 2, each of the image areas $I_1$–$I_4$ reaches a transverse image from start of scanline, represented by lines 20a, 20b, 20c, 20d, the associated image frames $l_1$, $I_2$, $I_3$, $I_4$ are progressively exposed on closely spaced transverse raster lines 22, shown with exaggerated longitudinal spacing on the image area $I_4$. Lines 20a, 20b, 20c, 20d represent the first scanline of the associated image frame and are formed by techniques known in the art and described, for example, in U.S. Pat. No. 5,208,796, incorporated herein by reference. Each image area, $I_4$, $I_3$, $I_2$, $I_1$ is exposed successively by ROS systems 26a, 26b, 26c and 26d. Although not shown, the multi-ROS configuration may include additional components, such as control circuitry as shown and described in relation to the single-ROS embodiment shown in FIG. 1.

Downstream from the exposure station, a development station (not shown) develops the latent image formed in the preceding image area. After the last color exposure, a fully developed color image is then transferred to an output sheet. With reference to FIG. 1, an electronic Sub System (ESS) 32 contains the circuit and logic modules which respond to input video data signals and other control and timing signals, to drive the photoreceptor belt 17 synchronously with the image exposure and to control the rotation of the polygon by the motor. Details of charge, development and transfer xerographic stations in a multiple exposure, single pass system are disclosed, for example, in U.S. Pat. Nos. 4,833,503; 4,611,901 and 4,791,452, whose contents are hereby incorporated by reference. For further details, reference is made to U.S. Pat. Nos. 5,381,165 and 5,208,796 also incorporated herein by reference.

Figure 3:
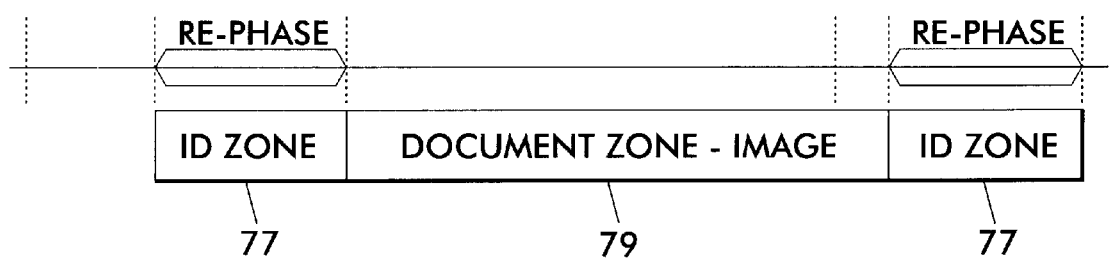
FIG. 3 illustrates a diagram of a portion of a photoconductive member according to an embodiment of the present invention.

According to a first embodiment of the invention, a method for calculating image registration in a process direction is provided. Ideally, as shown in FIG. 3, adjustments to image registration are performed between images. Therefore, rephasing of the rotating polygons occurs in an interdocument zone (ID zone) 77. Preferably, an ID zone is located between each document zone (image) 79.

According to this embodiment of the invention, a requested phase shift is provided. The requested phase shift may be determined by the use of print samples and a comparison of those samples to the expected print locations. By way of example, each ROS of a multi-ROS configuration may provide a predetermined imprint to the photoconductive member, with the imprint later transferred to an appropriate image receiving medium, such as paper. The predetermined imprints may then be analyzed to determine whether the spacing between them is correct. A similar activity may be performed with a single-ROS configuration, measuring the distance of a predetermined imprint from an edge of the paper or by its location on the photoconductive member.

Upon the determination of the requested phase shift, the requested phase shift is converted to clock cycles. In the present example, 1120 clock cycles equal one facet period of the rotating polygon. A facet period is the time between SOS signals during imaging, i.e. the time for imaging a scanline during imaging.

Figure 4:
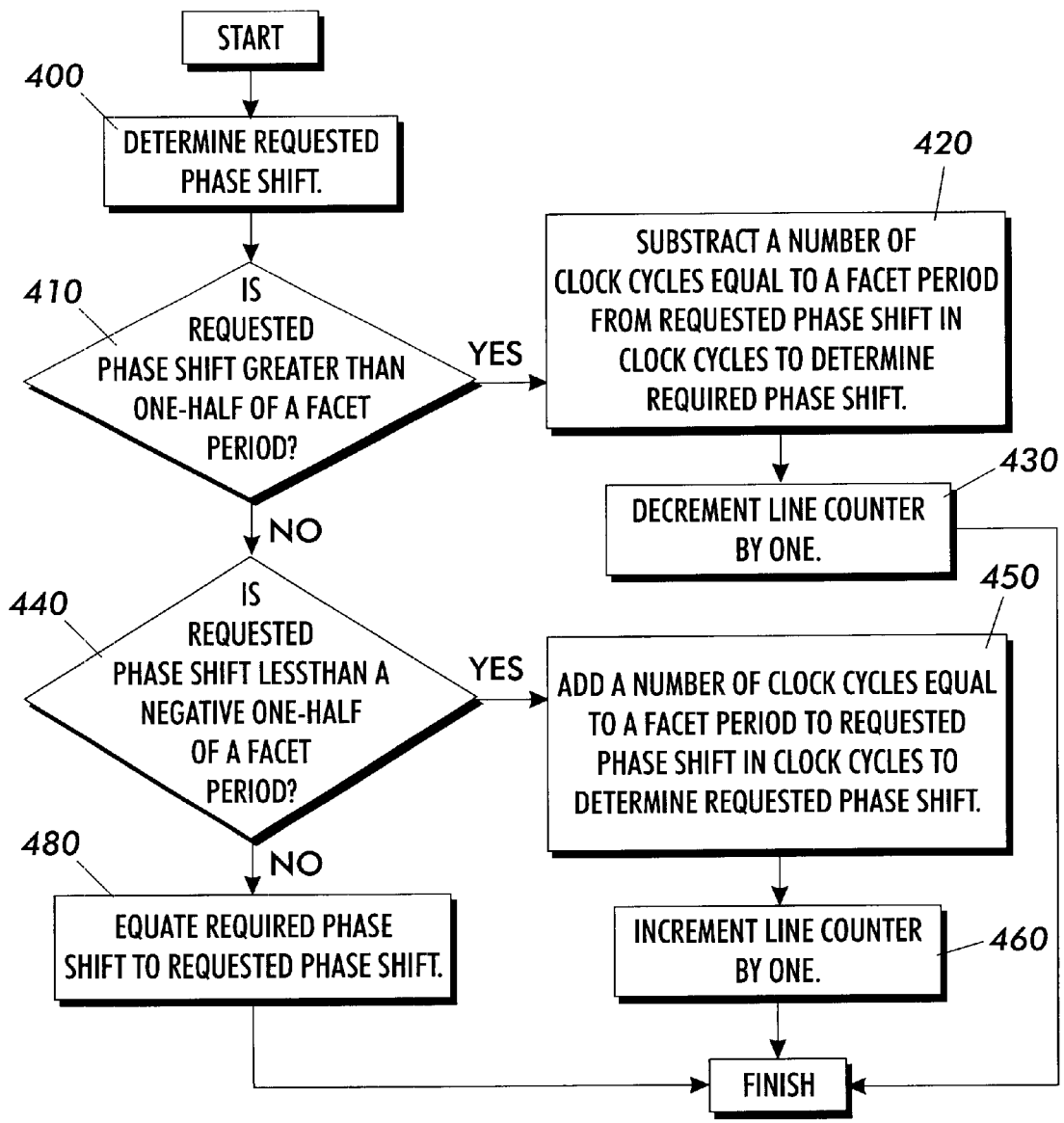
FIG. 4 illustrates a method of determining adjustments to a polygon rotation according to an embodiment of the present invention.

According to the present embodiment of the invention, a method of determining adjustments to the polygon rotation are determined according to a method as illustrated in FIG. 4. As discussed above, a requested phase shift is determined in clock cycles, step 400. If the requested phase shift in clock cycles is greater than one-half of the facet period in clock cycles, step 410, then a number of clock cycles equal to a full facet period is subtracted from the requested phase shift, step 420, and a line counter is decremented by one, step 430. In this way, the resulting required phase shift is minimized. Specifically, the required phase shift is never more than one-half of a facet period in either advanced or retard direction.

Furthermore, if the number of clock cycles of the requested phase shift is less than a negative number of clock cycles equal to one-half of a facet period, step 440, the number of clock cycles equal to a full facet period is added to the requested phase shift in clock cycles, step 450 and a line counter is incremented by one, step 460.

If the requested phase shift in clock cycles satisfies neither of the two conditions above and is therefore greater than or equal to a negative number of clock cycles equal to one-half a facet period and is less than or equal to a number of clock cycles equal to one-half of a facet period, the required phase shift equals the requested phase shift, step 480.

The line counter is used as a countdown counter to the start of the image registration. Therefore, by adjusting the line counter as described above, minimization of the rephasing of the rotating polygon is accomplished while maintaining a correct number of pixel lines between images.

Figure 5:
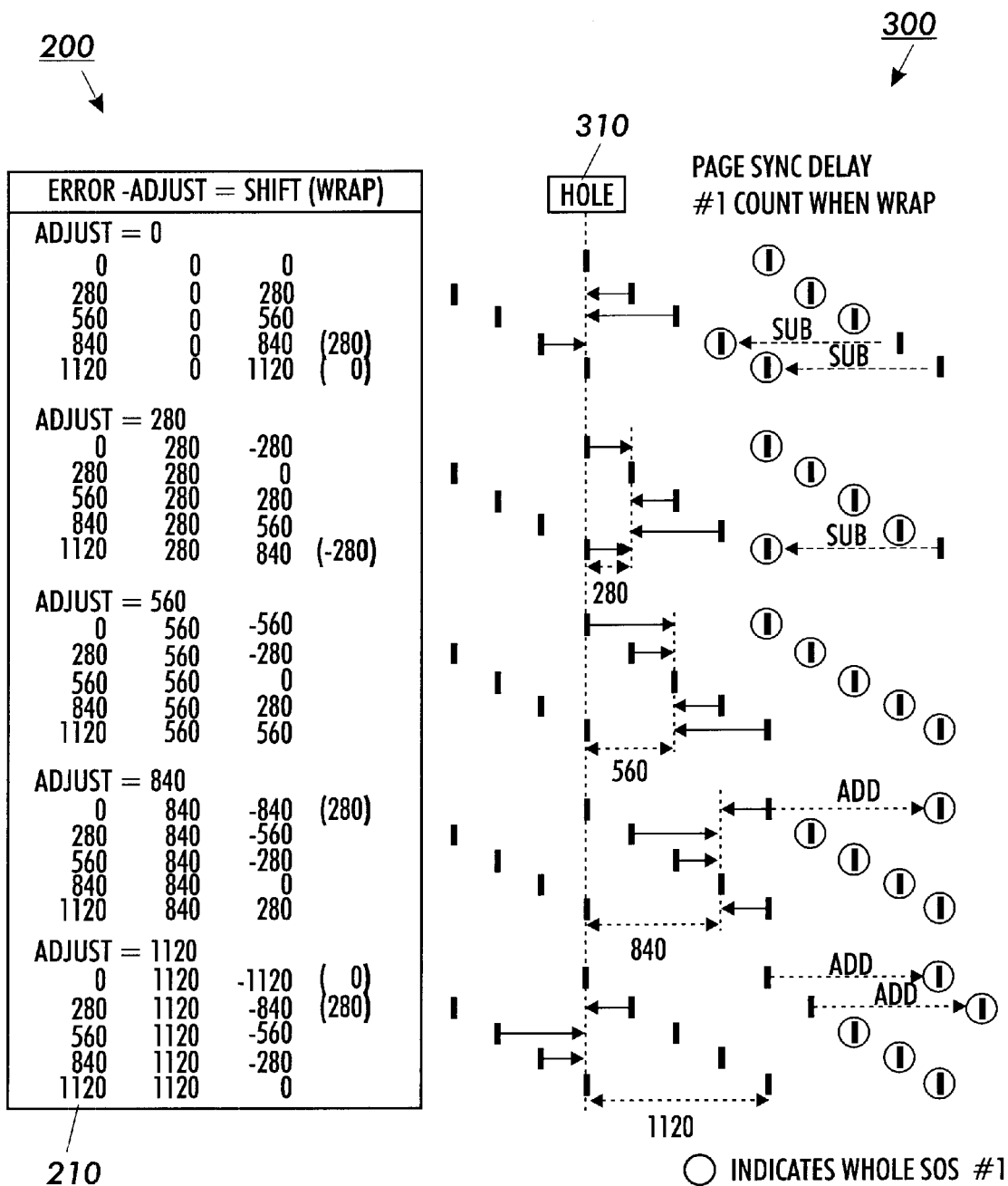
FIG. 5 illustrates various example timing scenarios according to a further embodiment of the present invention.

FIG. 5 includes various examples of the method of FIG. 4. FIG. 5 includes an information table 200 and a graphical illustration 300. A fine registration adjustment to enable sub-scan adjustment is included in the examples of FIG. 5 and is addressed in more detail below in relation to another embodiment of the invention. In summary, the fine registration, sub-scan adjustment, REPHASE ADJUST, allows adjustment of the phasing of each ROS independent of other ROSs and is incorporated into the determination of the phase shift by the following equation.

PHASE SHIFT=PHASE ERROR−REPHASE ADJUST

PHASE ERROR is the phase correction required to adjust a ROS to place an initial scan in an appropriate location according to a signal provided by the sensor corresponding to the ROS. REPHASE ADJUST allows for the correction of misregistrations caused by the mounting of the sensor in relation to the ROS.

The facet period is equal to 1120 in the examples provided in FIG. 5. 1120 cycles are the result of facet period of 280 μsec with a 250 nsec clock. By way of illustration, the example in row 210 of FIG. 5 will now be explained in relation to the method of FIG. 4 and the equation above. The rephase adjustment is determined to be 1120 in this case. This adjustment equal to the facet period can be caused by the hole 310 coming just after an SOS signal starting the line counter, with the SOS excluded from the count. The phase error is 280. 280−1120=−840 Therefore, the requested phase shift is −840.

According to the method of FIG. 4, step 410 proceeds to step 440. Because the requested phase shift is −840, which is less than −560, the negative number of clock cycles of one-half of a facet period, the method proceeds to step 450. A number of clock cycles equal to a facet period is added to the requested rephase adjustment, −840+1120=280 Therefore, the required phase adjustment is 280, less than one-half of a facet period. In order to maintain a proper start position of the image in relation to the signal provided by the sensor corresponding to the ROS, the line counter in incremented by one, step 460.

As shown in corresponding row of the graphical illustration 300, the mark on the photoconductive member, such as a hole 310 is represented by the vertical dotted line. In the present example, the "add" and the horizontal dotted line indicate an incrementing of the line counter.

In the present embodiment of the invention, it is to be noted that advancing ¾ of a facet period and retarding by ¼ of a facet period yield the same result. Because retarding ¼ of a facet period results in less positional displacement of the rotating polygon within the time allowed in the ID zone 77, alterations to the scan rate from the nominal imaging rotation speed are minimized. By way of example, in one variation of the invention, the ID zone 77 lasts for hundreds of clock cycles, during which any required phase adjustment is implemented by temporarily altering the rotation speed of the rotating polygon. The rotating polygon rotational speed is stabilized before the start of the document zone 79 to prevent distortion of the image.

Figure 6:
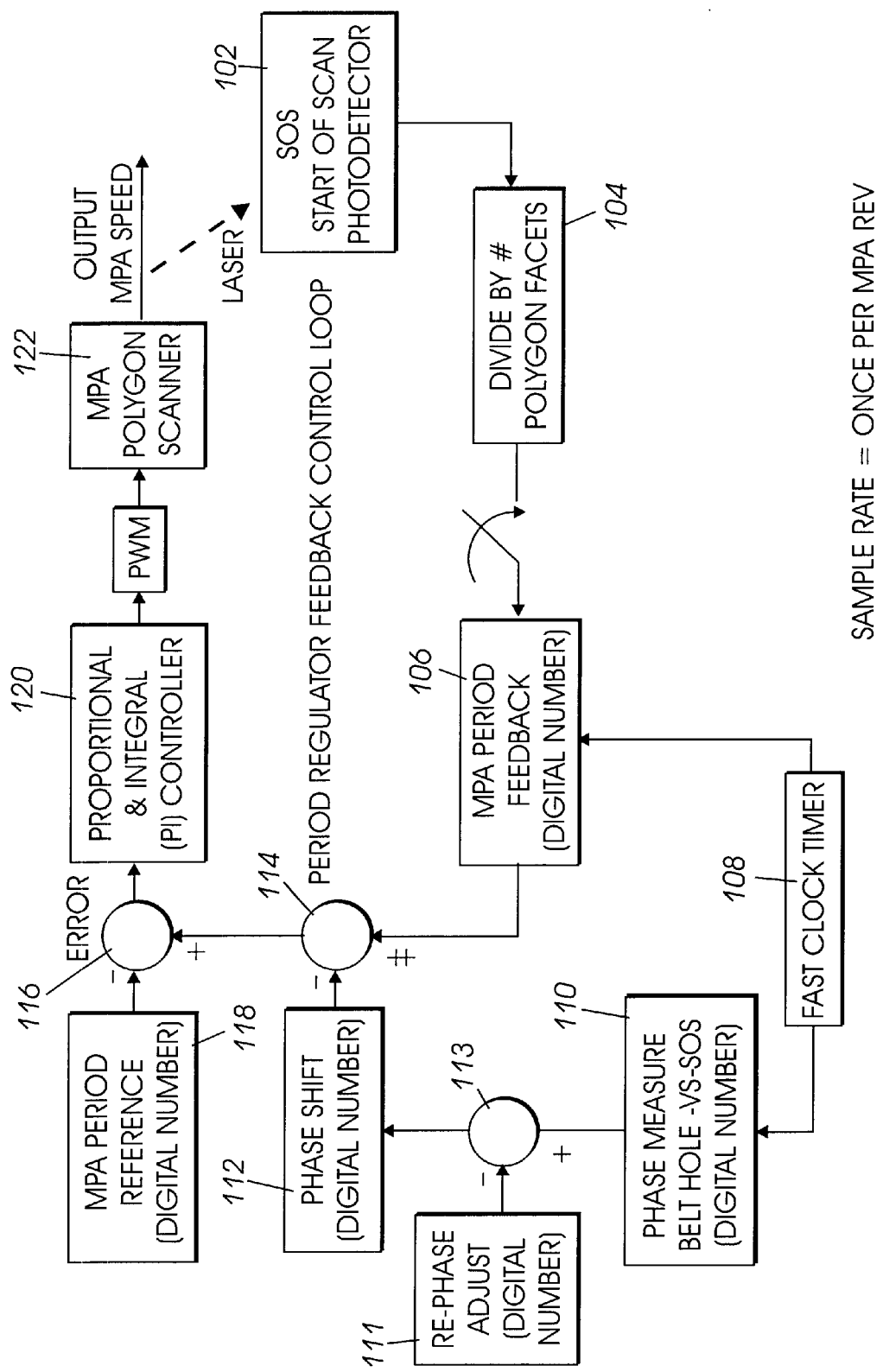
FIG. 6 illustrates a functional schematic of a ROS printing system according to an embodiment of the present invention.

In accordance with a further embodiment of the present invention, reference is made to FIG. 6. The motor speed control utilizes period feedback as measured from Start Of Scan (SOS) signals divided down by the number of facets on the polygon to measure a time period once per revolution of the polygon assembly. This improves period feedback resolution by measuring a larger period with respect to the fast clock used to measure the period.

The polygon assembly revolution time period is sampled and fed back at exactly the measurement time and rate of the polygon assembly once per revolution such that the polygon assembly PERIOD REFERENCE represents the desired period in fast clock counts and the polygon assembly PERIOD FEEDBACK represents the actual measured period once per revolution period in fast clock counts. Note the change in sign of the error subtraction to correct for the period feedback wrong sign. The benefit is that the numbers used within the control loop are purely time periods in fast clock counts such that if a number of counts were injected into the control loop, the polygon assembly will advance or retard and shift relative to its previous position. The phase shift is then represented very simply by time periods in fast clock counts.

This implementation directly extends to polygon rephasing without requiring mathematical manipulation of the measured rephase error and then converting it into a number representing a fraction of a scan that would also require divide calculation capability from the microcontroller. The direct injection of shift allows a phase error measure of SOS with respect to the marker on the belt, such as a belt hole, and then injection of this measure directly into the motor control loop to rephase the motor by the amount of rephase error measured.

Such a configuration avoids the need for higher-cost microcontrollers with divide math capability. This control method enables utilization of lower cost microcontrollers that are also shared between dual beam laser power control and motor control providing a significant cost savings.

With reference to FIG. 6, a motor polygon assembly (MPA) is shown at 122 providing a laser beam output at a given speed. A portion of the laser speed illustrated by the dotted arrow is sensed at 102 to provide SOS signals. The SOS signals are divided by the number of polygon facets shown at 104. An MPA period feedback signal is provided at 106. It is a digital number that is provided at a sample rate at once per polygon revolution. The fast clock timer 108 provides the fast clock pulses to digitize the period feedback signal and to digitize a phase signal representing the phase difference between the detection of an SOS signal and the detection of a belt hole signal shown at 110.

The phase difference between the detection of an SOS signal and the detection of a belt hole signal at 110 is representative of the time between the detection of an SOS signal and the detection of a belt hole signal. However, in multi-ROS configurations, the distance between each ROS and its pitch hole sensor may vary, causing misregistration errors if each ROS used the same adjustment amount. Difficulties may also result in single-ROS configurations involving belt 12 lengths not equal to an integer multiple of pixel size, causing misregistration errors in subsequent passes.

Figure 7:
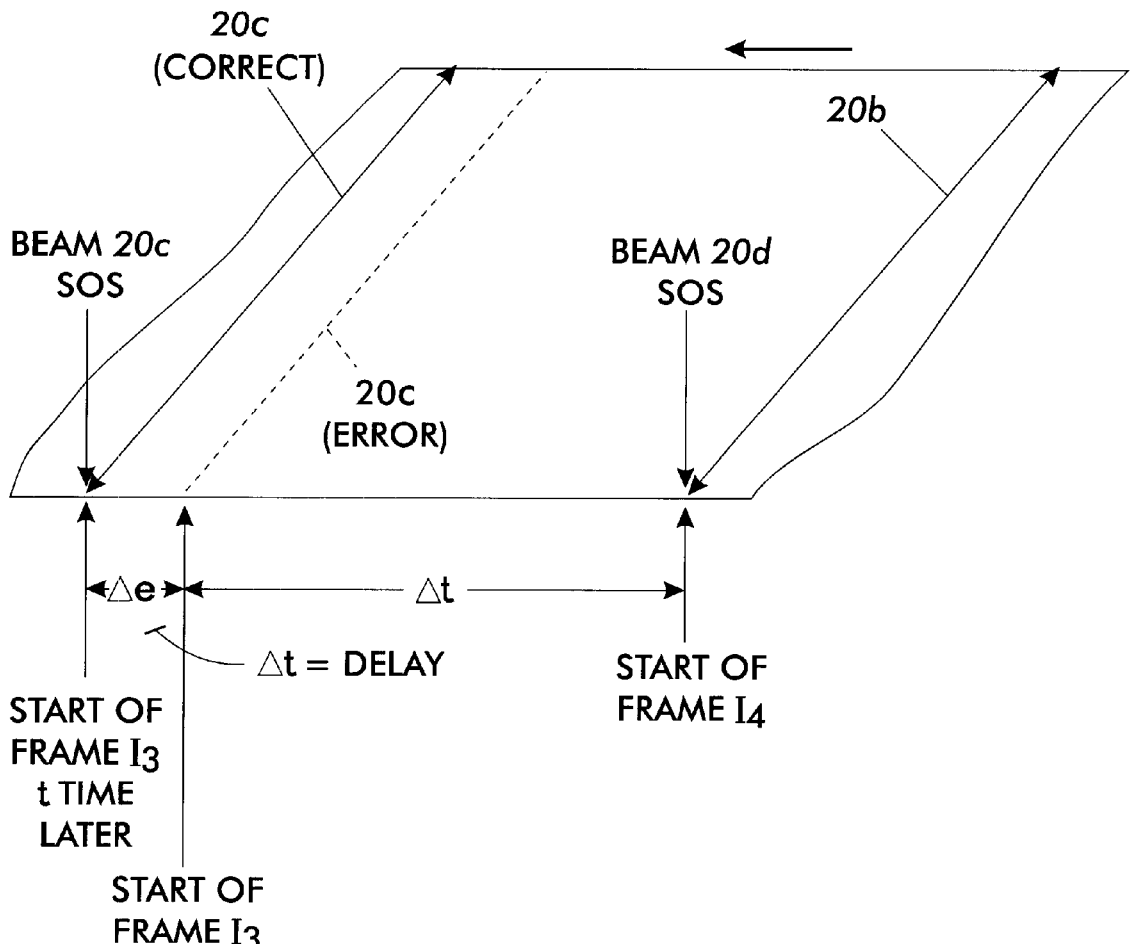
FIG. 7 illustrates an example of an incorrect scanline placement.

If the spacing and other errors were not present, the SOS for forming, for example, line 20c would happen at the exact moment that the image arrived at the required position. FIG. 7 shows the situation where the leading edge of the next image frame $I_3$ is n+½ start-of-scan or ½ pixel further from the leading edge of image frame $I_4$. Thus, instead of forming a line 20c in the "correct" (solid line) position, the line is formed in an inaccurate (dotted) line position, separated from the required line by a slow scan pixel error, for this case assumed to be ½ pixel (or about 20 $\mu$).

To correct for such errors, a rephase adjust is provided at 111 in the form of a digital number to provide sub-scan adjustment of each ROS. Therefore the rotation of the ROS can be adjusted to precisely locate the image on the belt. A summing junction 113 is provided to respond to the phase difference between the detection of an SOS signal and the detection of a belt hole signal shown at 110 and the rephase adjust 111 in accordance with the following equation.

PHASE SHIFT=PHASE ERROR−REPHASE ADJUST

A phase shift digital number provided at 112 and summing junction 114 responds to both a phase shift number from 112 and an MPA period feedback number to provide a combined signal to summing function 116. Summing junction 116, according to the present embodiment, subtracts an MPA reference number, shown at 118, from the feedback signal provided from summing junction 114. Normally, the feedback signal is subtracted from the reference. The net result is that the error calculated has the correct sign or polarity for the closed loop. The error signal from summing function 116 is provided to controller 120 in turn controlling the motor polygon assembly 122.

The above described solution to the beam positioning and start-of-scan signal line results in a very accurate line spacing within a pixel of resolution. Certain systems require even greater resolution, and according to an embodiment of the invention, subpixel registration errors are eliminated.

The above embodiment-of the present invention is most beneficial in applications involving multi-ROS applications by allowing differences in distances between rotating polygons and the corresponding sensor, such as a hole sensor, to be compensated. However, the sub-scan rotating polygon adjustment by the adjustment of clock cycles may also be incorporated in applications having a single ROS, to similarly enable precise location of an image.

The present invention may be used to overcome irregularities in various ROS configurations. For example, a photoconductive surface, such as a repeating belt, having a length greater than an imager number of pixels, can result in irregularities. Also, temperature variations of the photoconductive surface affect surface dimensions. Other temperature dependent dimension changes may also be addressed, such as polygon facet alignment, and expansion and contraction of a frame or other components to which the various components of the present invention are mounted and located relative to each other.

A rephase adjust digital number 111 can be generated in a number of ways. For example, each ROS can be initially operated by the ESS 30 to lay down only one scanline each. These lines are developed and an output print is made. The offset lines can be measured with sub-pixel accuracy by inspection under magnification. The misregistration error is then converted into the whole, n, and fractional, Δe, pixel errors.

These examples are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

1. A method for calculating image registration in a process direction by minimizing a required phase shift of a rotating polygon in a raster output scanner, including the steps of:

determining a requested phase shift in clock cycles of said rotating polygon to align a beam reflected from a first facet of said rotating polygon to a location on a photoconductive surface;

if said requested phase shift in clock cycles is greater than a number of clock cycles equal to one-half of a period between said first facet and a neighboring, subsequent second facet, subtract a number of clock cycles equal to the period between said first facet and said second facet from said requested phase shift in clock cycles to determine a required phase shift and decrement a line counter by one;

if said requested phase shift in clock cycles is less than a negative number of clock cycles equal to one-half of the period between said first facet and said second facet, add a number of clock cycles equal to the period between said first facet and said second facet from said requested phase shift in clock cycles to determine said required phase shift and increment said line counter by one; and if said requested phase shift in clock cycles is greater than or equal to a negative number of clock cycles equal to one-half of the period between said first facet and said second facet and is less than or equal to a number of clock cycles equal to one-half of the period between said first facet and said second facet, equate said required phase shift to said requested phase shift;

wherein said line counter represents a number of pixel lines before a start of image registration on said photoconductive surface.

2. The method for calculating image registration of claim 1, wherein said raster output scanner comprises multiple rotating polygons and said determining step involves determining a requested phase shift in clock cycles for each of said multiple rotating polygons.

3. The method for calculating image registration of claim 2, wherein each of said multiple rotating polygons corresponds to a different color to enable a color image to be formed on said photoconductive surface.

4. The method for calculating image registration of claim 1, wherein said number of clock cycles equal to one-half of the period between said first facet and said second facet is a predetermined number.

5. A controller for calculating image registration in a process direction by minimizing a required phase shift of a rotating polygon in a raster output scanner, said controller performing the steps of:

determining a requested phase shift in clock cycles of said rotating polygon to align a beam reflected from a first facet of said rotating polygon to a location on a photoconductive surface;

if said requested phase shift in clock cycles is greater than a number of clock cycles equal to one-half of a period between said first facet and a neighboring, subsequent second facet, subtract a number of clock cycles equal to the period between said first facet and said second facet from said requested phase shift in clock cycles to determine a required phase shift and decrement a line counter by one;

if said requested phase shift in clock cycles is less than a negative number of clock cycles equal to one-half of the period between said first facet and said second facet, add a number of clock cycles equal to the period between said first facet and said second facet from said requested phase shift in clock cycles to determine said required phase shift and increment said line counter by one; and if said requested phase shift in clock cycles is greater than or equal to a negative number of clock cycles equal to one-half of the period between said first facet and said second facet and is less than or equal to a number of clock cycles equal to one-half of the period between said first facet and said second facet, equate said required phase shift to said requested phase shift;

wherein said line counter represents a number of pixel lines before a start of image registration on said photoconductive surface.

6. The controller of claim 5, wherein said raster output scanner comprises multiple rotating polygons and said determining step involves determining a requested phase shift in clock cycles for each of said multiple rotating polygons.

7. The controller of claim 6, wherein each of said multiple rotating polygons corresponds to a different color to enable a color image to be formed on said photoconductive surface.

8. The controller of claim 5, wherein said number of clock cycles equal to one-half of the period between said first facet and said second facet is a predetermined number.

9. A raster output scanner imaging apparatus, comprising:

a photoconductive surface adapted to move in a process direction relative to a frame;

a first rotating polygon rotatably mounted to said frame and having a plurality of facets adapted to reflect a beam onto said photoconductive surface in the form of first scanlines oriented transverse to said process direction;

a first sensor corresponding to said first rotating polygon and mounted to said frame and near said photoconductive surface to enable positional information of said photoconductive surface to be detected;

a second rotating polygon rotatably mounted to said frame and having a plurality of facets adapted to reflect a beam onto said photoconductive surface in the form of second scanlines oriented transverse to said process direction;

a second sensor corresponding to said second rotating polygon and mounted to said frame and near said photoconductive surface to enable positional information of said photoconductive surface to be detected;

a controller in communication with said first rotating polygon, said first sensor, said second rotating polygon and said second sensor for synchronizing said first rotating polygon and said second polygon to position said first scanlines and said second scanlines at a common location on said photoconductive surface;

wherein said controller is adapted to adjust a rotational position of at least one of said first rotating polygon and said second rotating polygon based at least on a phase adjust signal derived from a difference in a first distance between said first rotating polygon and said first sensor and a second distance between said second rotating polygon and said second sensor so as to compensate for any misregistration.

10. An imaging system for forming multiple superimposed image exposure frames on a photoconductive surface moving in a process direction, comprising:

a raster output scanner forming a plurality of scanlines in a traverse direction across the width of said photoconductive surface by reflecting modulated beams from a plurality of facets of a rotating polygon;

a photoconductive surface indicator for registering images on the photoconductive surface;

a sensor corresponding to the raster output scanner mounted near the photoconductive surface to detect the photoconductive surface indicator;

means for detecting the beginning of a scanline and providing a start of scan (SOS) signal representing the detection;

means for detecting a relative phase between the lead edge of the start of scan signal and the detection of said indicator including a fast clock timer to provide a phase shift digital count;

means for detecting a rephase adjust value required to correct for a distance between said raster output scanner and the sensor; and means for changing the speed of the rotating polygon to synchronize the phase of said indicator with the lead edge of said SOS signal and incorporate said rephase adjust value.

11. The system of claim 10 wherein the means for changing the speed of the rotating polygon includes a sign inversion summing junction.

12. The system of claim 11 wherein the sign inversion summing junction responds to a digital signal representing a speed feed back signal and a phase shift signal.

13. The system of claim 12 wherein the sign inversion summing junction responds to a digital signal representing a period reference.

14. The system of claim 10 wherein the means for changing the speed of the rotating polygon includes a speed adjustment based upon periods between polygon facets.

15. The system of claim 14 wherein the periods between polygon facets is determined by the fast clock timer.

16. The system of claim 10 wherein the means for changing the speed of the rotating polygon includes a summing junction responding to a period feedback digital signal and a phase shift digital signal.

17. In an imaging system for forming multiple superimposed image exposure frames on a photoconductive surface moving in a process direction, a method of providing scanning speed and phase shift control comprising the steps of:

forming a plurality of scanlines in a transverse direction across the width of said photoconductive surface by reflecting modulated beams from a plurality of facets of a rotating polygon;

sensing scanning speed;

providing a signal representing image exposure frame registration from a sensor;

detecting the beginning of a scanline and providing a start of scan (SOS) signal representing the detection;

detecting a rephase adjust required to correct for a distance between said rotating polygon and the sensor;

determining a relative phase between the start of scan signal and the signal representing image exposure frame registration;

converting scanning speed and relative phase into digital signals; and summing the digital signals and subtracting the rephase adjust and inverting the polarity in order to change the speed of the rotating polygon to synchronize the signal representing image exposure frame registration with the SOS signal.

* * * * *